United States Patent
Kim et al.

(10) Patent No.: US 8,652,679 B2
(45) Date of Patent: Feb. 18, 2014

(54) RECHARGEABLE BATTERY

(75) Inventors: Jun-Sik Kim, Yongin-si (KR); Sung-Soo Kim, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 303 days.

(21) Appl. No.: 13/070,258

(22) Filed: Mar. 23, 2011

(65) Prior Publication Data

US 2011/0287301 A1    Nov. 24, 2011

(30) Foreign Application Priority Data

May 20, 2010 (KR) .................. 10-2010-0047719

(51) Int. Cl.
    *H01M 6/42*   (2006.01)
(52) U.S. Cl.
    USPC ............ 429/159; 429/66; 429/100; 429/129; 429/138; 429/139; 429/143; 429/151; 429/172; 429/186
(58) Field of Classification Search
    USPC ............ 429/66, 96, 100, 121, 143, 151, 153, 429/159, 163, 167, 172, 175–176, 186, 429/129–130, 138–139
    See application file for complete search history.

(56) References Cited

U.S. PATENT DOCUMENTS

| | | | |
|---|---|---|---|
| 6,489,054 B2 | 12/2002 | Cheiky et al. | |
| 7,175,936 B2 | 2/2007 | Kawamura et al. | |
| 7,776,466 B2 | 8/2010 | Oh | |

FOREIGN PATENT DOCUMENTS

| | | | | |
|---|---|---|---|---|
| JP | 2003-115285 A | 4/2003 | | |
| JP | 2004-063278 | 2/2004 | | |
| JP | 2004-158344 | * 6/2004 | ............ | H01M 10/04 |
| JP | 2004-227921 | * 8/2004 | ............ | H01M 2/10 |
| JP | 2004-525492 | 8/2004 | | |
| JP | 2007-188747 | 7/2007 | | |
| KR | 1020060092429 | 8/2006 | | |
| KR | 10-2006-0102208 A | 9/2006 | | |
| KR | 1020070087276 | 8/2007 | | |

OTHER PUBLICATIONS

Korean Notice of Allowance dated Oct. 26, 2012 for Korean Patent Application No. KR 10-2010-0047719 which corresponds to captioned U.S. Appl. No. 13/070,258.
Office Action dated Jul. 20, 2011 for corresponding KR Application No. 10-2010-0047719 (Sep. 5, 2011—040178952).
Office Action dated Mar. 28, 2012 for corresponding KR Application No. 10-2010-0047719.

* cited by examiner

*Primary Examiner* — Patrick Ryan
*Assistant Examiner* — Ben Lewis
(74) *Attorney, Agent, or Firm* — Knobbe, Martens, Olson & Bear, LLP (57) ABSTRACT

A rechargeable battery according to an exemplary embodiment of the present invention includes: an electrode assembly including a positive electrode, a negative electrode, a separator disposed between the positive and negative electrodes and having an expanded portion protruding to the outside of the positive and negative electrodes; a fixing member including a first support contacting a first outer side of the expanded portion, a second support contacting a second outer side, facing the opposite direction of the first outer side, and a joining portion joining the first and second supports; and a terminal electrically connected with the electrode assembly.

23 Claims, 10 Drawing Sheets

RECHARGEABLE BATTERY

RELATED APPLICATIONS

This application claims priority to and the benefit of Korean Patent Application No. 10-2010-0047719 filed in the Korean Intellectual Property Office on May 20, 2010, the entire contents of which are incorporated herein by reference.

BACKGROUND

1. Field

The described technology relates generally to a rechargeable battery. More particularly, the described technology relates generally to a rechargeable battery having an electrode assembly with an improved fixing structure.

2. Description of the Related Art

Unlike a primary battery that is incapable of being recharged, a rechargeable battery is a battery that can be repeatedly charged and discharged. A low-capacity rechargeable battery having a single cell is used in small portable electronic apparatuses, such as mobile phones, laptop computers, and camcorders. A large-capacity rechargeable battery that includes a plurality of cells connected in a pack shape is used as a power source for driving a motor of a hybrid electric vehicle and the like.

Recently, a high power rechargeable battery that includes a non-aqueous electrolyte having a high energy density has been developed. This battery comprises a large capacity rechargeable battery in which a plurality of rechargeable batteries are coupled in series in order to use it to drive devices requiring a large amount of power, for example, motors such as for electric vehicles.

A rechargeable battery has an electrode assembly formed of a positive electrode, a negative electrode, and a separator disposed between the positive and negative electrodes. The electrode assembly may have a spiral-wound structure or a structure in which a plurality of sheets are stacked.

For the stacked electrode assembly, arrangement of the electrodes and the separator in predetermined locations is very important. Particularly, for a pouch-type battery, the battery is not externally strong so that charging and discharging efficiency may be deteriorated when electrodes and a separator are misarranged due to external impact after being stacked.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide a rechargeable battery improved in safety.

A rechargeable battery according to an exemplary embodiment of the present invention includes: an electrode assembly including a positive electrode, a negative electrode, a separator disposed between the positive and negative electrodes and having an expanded portion protruding to the outside of the positive and negative electrodes; a fixing member including a first support contacting a first outer side of the expanded portion, a second support contacting a second outer side, facing the opposite direction of the first outer side, and a joining portion joining the first and second supports; and a terminal electrically connected with the electrode assembly.

The fixing member may penetrate the expanded portion, and may be formed at each corner of the separator.

A first support bar connecting the fixing members and extended along the expanded portion may be fixed to the fixing member. A groove to which the expanded portion is inserted may be formed in the first support bar, and a second support bar connecting the fixing members and extended in the diagonal direction of the separator may be fixed to the fixing member. The second support bar may be provided in plural and a pressing plate may be formed in a crossing portion of the second support bars.

The fixing member may include a first fastening unit including a joining portion penetrating the expanded portion and a head portion formed at a first end of the joining portion with a larger horizontal cross second than the joining portion and a second fastening unit fitted to the first fastening unit.

A hook protruding from an external circumference of the joining portion may be formed at a second end of the joining portion, opposite to the first end where the head portion is formed. The first fastening unit and the second fastening unit may be screw-coupled. The second fastening unit may be welded to the first fastening unit.

The fixing member may include a joining portion penetrating the expanded portion, a head portion formed at a first end of the joining portion with a larger horizontal cross section than the joining portion, and a head portion contacting a first outer side of the separator, and a hook protruding from an external circumference of a second end of the joining portion and contacting a second outer side of the separator.

A cross section of the hook is gradually decreased as it goes away from the joining portion and may be supported by the circumference of the hole.

The fixing member may include: a first fastening unit including a plurality of first support bars extended along the expanded portion and connected with each other and a protrusion protruding from a corner where the first support bars are connected, and arranged to contact a second side of the electrode assembly; and a second fastening unit including a plurality of first support bars extended along the expanded portion and connected with each other and a fastening groove to which the protrusion is inserted formed at a corner where the first support bars are connected, and arranged to contact the second side of the electrode assembly.

A hook protruding from an external circumference of the protrusion may be formed at a lower end of the protrusion, and the hook is hooked to an inlet of the fastening groove, and a groove to which the expanded portion is inserted may be formed at a side facing the first support bar of the first fastening unit and the first support bar of the second fastening unit. In addition, the first fastening unit may include a second support bar formed extending from one corner to the other corner along the diagonal direction of the electrode assembly.

The fixing member may include: a first fastening unit including a plurality of first support bars extended along the expanded portion and connected with each other and a protrusion protruding from a corner where the first support bars are connected, and arranged to contact a second side of the electrode assembly; and a second fastening unit including a plurality of first support bars extended along the expanded portion and connected with each other and a fastening groove to which the protrusion is inserted formed at a corner where the first support bars are connected, and arranged to contact the second side of the electrode assembly. A welded portion may be formed at an portion where the protrusion and the fastening hole are in contact with each other. The fixing member may be made of a porous material.

According to the exemplary embodiment of the present invention, the structure of the electrode assembly can be stably maintained so that stability of the rechargeable battery can be improved.

DETAILED DESCRIPTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. In the drawings and description, like reference numerals designate like elements throughout the specification.

Figure 1:
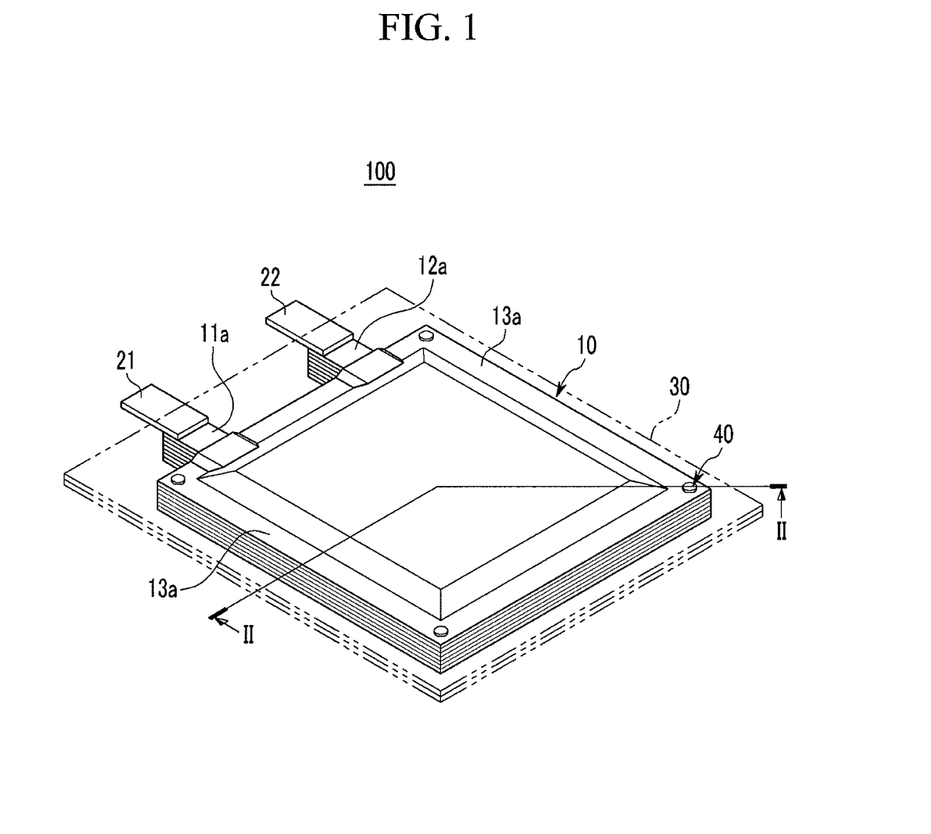
FIG. 1 is a perspective view of a rechargeable battery according to a first exemplary embodiment of the present invention.
Figure 2:
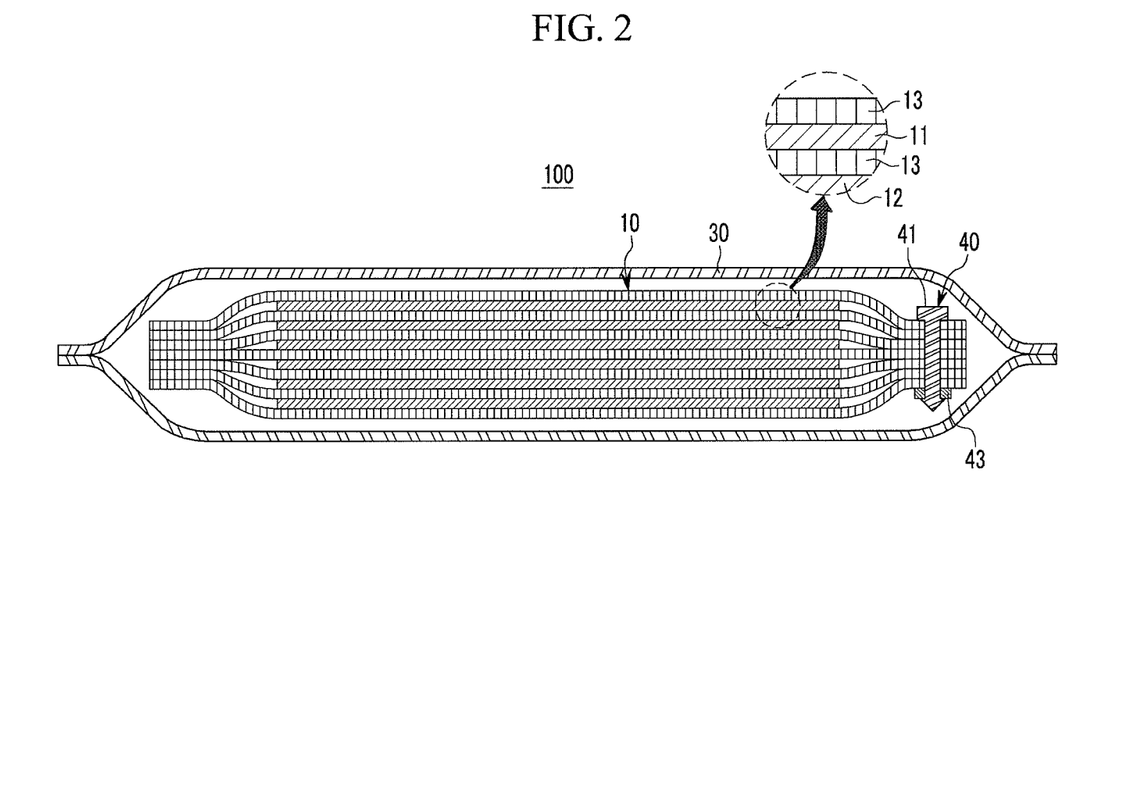
FIG. 2 is a cross-sectional view of FIG. 1, taken along the line II-II.

FIG. 1 is a perspective view of a rechargeable battery according to a first exemplary embodiment of the present invention and FIG. 2 is a cross-sectional view of FIG. 1, taken along the line II-II.

Referring to FIG. 1 and FIG. 2, a rechargeable battery 100 according to the first exemplary embodiment includes an electrode assembly 10 having a positive electrode 11, a negative electrode 12, and a separator 13 interposed between the positive and negative electrodes 11 and 12, a case 30 in which the electrode assembly 10 is inserted, a positive electrode terminal 21 electrically connected with the positive electrode 11, and a negative electrode terminal 22 electrically connected with the negative electrode 12.

The positive electrode 11 is formed of a positive electrode current collector formed with a thin metal plate such as aluminum and a positive electrode active material layer formed on the positive electrode current collector. The negative electrode 12 is formed of a negative electrode current collector formed with a thin metal plate such as copper and a negative electrode active material layer formed on the negative electrode current collector. The electrode assembly 10 has a structure where a plurality of positive and negative electrodes 11 and 12 of a rectangular sheet shape are alternately laminated while interposing the separator 13 therebetween.

A positive electrode uncoated region 11a and a negative electrode uncoated region 12a are formed at one end of the electrode assembly 10, and a positive electrode terminal 21 is welded to the positive electrode uncoated region 11a and a negative electrode terminal 22 is welded to the negative electrode uncoated region 12a.

The case 30 has the shape of a pouch and is formed with films bonded to each other. However, the present invention is not limited thereto. That is, the case 30 may be formed with a metal or a firm polymer.

The positive electrode 11, the negative electrode 12, and the separator 13 are formed in a rectangular sheet shape. The separator 13 is interposed between the positive electrode 11 and the negative electrode 12 to provide a path for ion while insulating the positive electrode 11 and the negative electrode 12. An expanded portion 13a formed in the separator 13 protrudes further outward than the positive electrode 11 and the negative electrode 12. The expanded portion 13a protrudes further outward than the side ends of the positive and negative electrodes 11 and 12, and the expanded portion 13a of the present exemplary embodiment protrudes further outward than four side ends of each of the positive electrode 11 and the negative electrode 12. In the electrode assembly 10, a region where the expanded portion 13a is located is smaller in thickness than a region where the positive electrode 11 and the negative electrode 12 are located.

Since a fixing member 40 is installed in the separator 13, penetrating the expanded portion 13a, the fixing member 40 is installed in a corner portion adjacent to the corner of the separator 13. The separator 13 of the present exemplary embodiment has a rectangular sheet shape, and therefore four fixing members 40 are provided in the separator 13.

The fixing members 40 close the expanded portions 13a of the separator 13 to support the positive electrode 11, the negative electrode 12, and the separator 13 with the expanded portions 13a.

The fixing member 40 has a first support contacting a first outer surface of the expanded portion 13a and a second support contacting the second outer outer surface facing the opposite direction of the first outer surface. The supports are fixed through a joining portion.

The fixing member 40 includes a first fastening unit 41 penetrating the expanded portion 13a and a second fastening unit 43 fitted to the first fastening unit 41.

Figure 3:
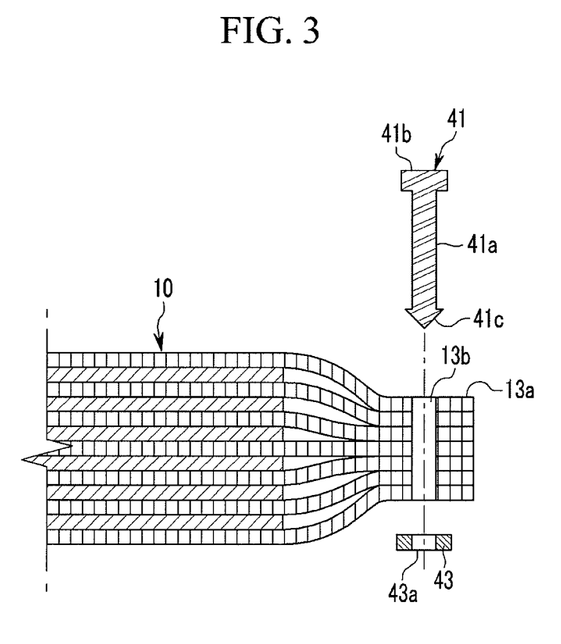
FIG. 3 is an exploded perspective view of an electrode assembly and a fixing member according to the first exemplary embodiment of the present invention.

Referring to FIG. 3, a fixing hole 13b penetrating a thickness direction is formed in the expanded portion 13a. The first fastening unit 41 includes a joining portion 41a inserted to the fixing hole 13b and fastened to the expanded portion 13a, while penetrating therethrough, a head portion 41b formed at one end of the joining portion 41a with a larger horizontal cross-section than the joining portion 41a, and a hook 41c formed at the other end of the joining portion 41a, protruding from an external circumference of the joining portion 41a. In the second fastening unit 43, a hole 43a to which the joining portion 41a is fitted is formed.

The joining portion 41a is substantially formed in the shape of a circular bar, and the head portion 41b has a larger horizontal cross-section than the joining portion 41a and protrudes more to the outside than the external circumference of the joining portion 41a. The head portion 41b of the present exemplary embodiment has a circular cross-section, but the present invention is not limited thereto. That is, the head portion 41b may be formed in various shapes such as a triangle, a quadrangle, and the like. The hook 41c protrudes from the external circumference of the joining portion 41a, and has a conical shape of which a cross-section is gradually decreased as it goes away from the joining portion 41a. The hook 41c with such a structure is passed through the hole 43a and hooked thereto such that it can prevent the joining portion 41a from being separated from the second fastening unit 43.

The bottom surface of the head portion 41b contacts the expanded portion 13a to support a first side of the expanded portion 13a and the second fastening unit 43 supports a second end of the expanded portion 13a such that the expanded portion 13a is closed. Accordingly, the head portion 41b becomes the first support and the second fastening unit 43 becomes the second support according to the present exemplary embodiment. The first support and the second support are supported by the joining portion 41a and press both external sides of the expanded portion 13a to the inner side thereof.

As described, according to the present exemplary embodiment, the separator 13 can stably support the positive electrode 11 and the negative electrode 12 located in the inner side of the expanded portion 13a, and the entire arrangement of the electrode assembly 10 can be stably maintained. For the stack-type electrode assembly 10, the positive electrode 11, the negative electrode 12, and the separator 13 may be misarranged due to external impact or vibration, and thus according to the present exemplary embodiment, the arrangement of the electrode arrangement 10 can be stably maintained by installing the fixing member 40.

In addition, the electrode assembly 10 is supported through the expanded portion 13a so that a short-circuit of the positive and negative electrodes 11 and 12 can be prevented in at least some circumstances even though the separator 13 contracts at high temperature.

While repeating charging and discharging, temperature of the rechargeable battery 100 is increased and the temperature may be increased very high depending on environment. When the temperature is increased, the contraction ratio of the separator 13 is higher than the contraction ratio of the positive and negative electrodes 11 and 12, and accordingly the positive and negative electrodes 11 and 12 may be short-circuited due to contraction of the separator 13. When the positive electrode 11 and the negative electrode 12 are short-circuited, a large amount of heat is rapidly generated from the short-circuit portion so that the rechargeable battery 100 may catch fire or even explode. However, as in the present exemplary embodiment, the short-circuit of the positive and negative electrodes 11 and 12 due to contraction of the separator 13 is inhibited.

In addition, when fixing member 40 is formed to penetrate the positive electrode 11, the negative electrode 12, and the separator 13, the positive electrode 11, the negative electrode 12, or the separator 13 may be torn or the fixing member 40 may be damaged due to a sheer stress applied to the fixing member 30 depending on a difference of the contraction ratio at high temperature. When the separator 13 is torn, the positive electrode 11 and the negative electrode 12 may be short-circuited through the torn portion.

However, according to the present exemplary embodiment, the electrode assembly 10 is supported through the expanded portion 13a so that stability can be improved by stably supporting the electrode assembly 10 and safety can be improved by preventing or at least inhibiting the short-circuit at high temperature. Further, the expanded portion 13a can store electrolyte solution.

Figure 4:
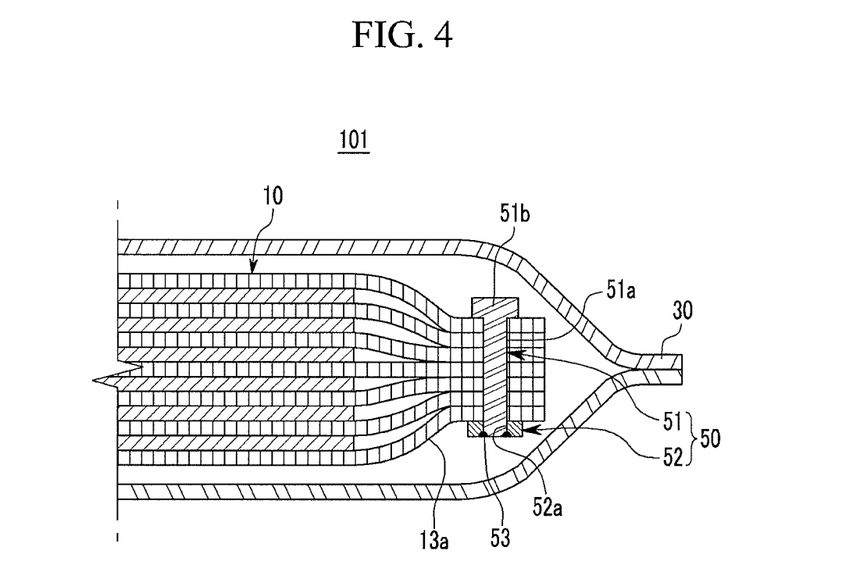
FIG. 4 is a partial cross-sectional view of a rechargeable battery according to a second exemplary embodiment of the present invention.

FIG. 4 is a partial cross-sectional view of a rechargeable battery according to a second exemplary embodiment of the present invention.

Referring to FIG. 4, a rechargeable battery 101 according to the present exemplary embodiment is the same as the rechargeable battery 100 of the first exemplary embodiment, excluding a structure of a fixing member 50, and therefore a description for the same structure will not be provided.

A fixing member 50 includes a first fastening unit 51 penetrating an expanded portion 13a and a second fastening unit 52 fitted to the first fastening unit 51.

The first fastening unit 51 has a joining portion 51a inserted to a fixing hole 13b and penetrating the expanded portion 13a and a head portion 51b formed at one end of the joining portion 51a with a larger horizontal cross-section than the joining portion 51a. The joining portion 51a is substantially formed in the shape of a circular bar, and the head portion 51b has a larger horizontal cross-section than the joining portion 51a and protrudes more to the outside than the external circumference of the joining portion 51a.

A hole 52a to which the joining portion 51a is inserted is formed in the second fastening unit 52 so that the joining portion 51a is inserted to the second fastening unit 52, and a welded portion 53 is formed at a portion where the second fastening unit 52 and the joining portion 51a are in contact with each other. According to the present exemplary embodiment, the first fastening unit 51 and the second fastening unit 52 are formed with polymer, and fixed by hot-welding.

Figure 5:
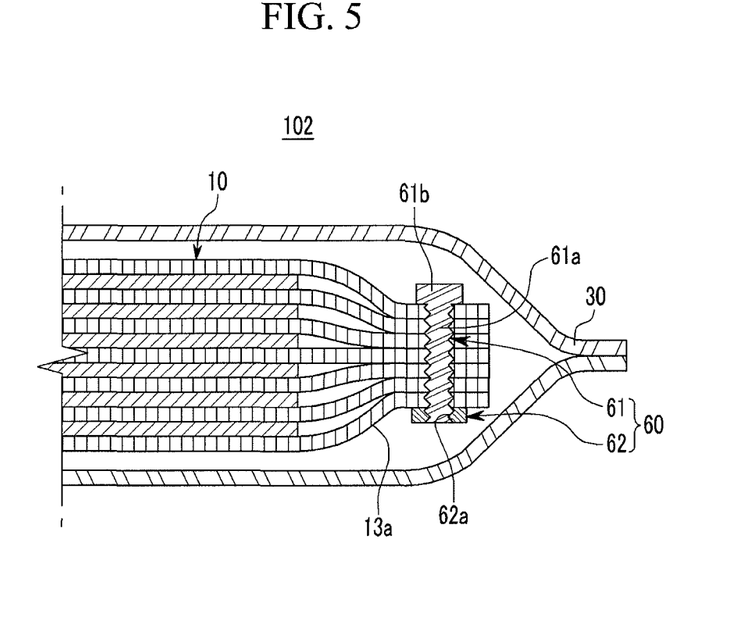
FIG. 5 is a partial cross-sectional view of a rechargeable battery according to a third exemplary embodiment of the present invention.

FIG. 5 is a partial cross-sectional view of a rechargeable battery according to a third exemplary embodiment of the present invention.

Referring to FIG. 5, a rechargeable battery 102 of the present exemplary embodiment is the same as the rechargeable battery 100 of the first exemplary embodiment of the present invention, excluding a structure of a fixing member 60, and therefore a description for the same structure will not be further provided.

A fixing member 60 includes a first fastening unit 61 penetrating an expanded portion 13a and a second fastening unit 62 fitted to the first fastening unit 61.

The first fastening unit 61 has a joining portion 61a inserted to a fixing hole 13b and penetrating the expanded portion 13a and a head portion 61b formed at one end of the joining portion 61a with a larger horizontal cross-section than the joining portion 61a. The joining portion 61a is substantially formed in the shape of a cylinder, and the head portion 61b has a larger horizontal cross-section than the joining portion 61a and protrudes more to the outside than the external circumference of the joining portion 61a. The external circumferential surface of the joining portion 61a of the first fastening unit 61 is formed of a screw-processed bolt.

The second fastening unit 62 is formed of a nut having a hole 62a to which the joining portion 61a is inserted. The first fastening unit 61 and the second fastening unit 62 are fixed to each other by screw-coupling with each other.

Figure 6:
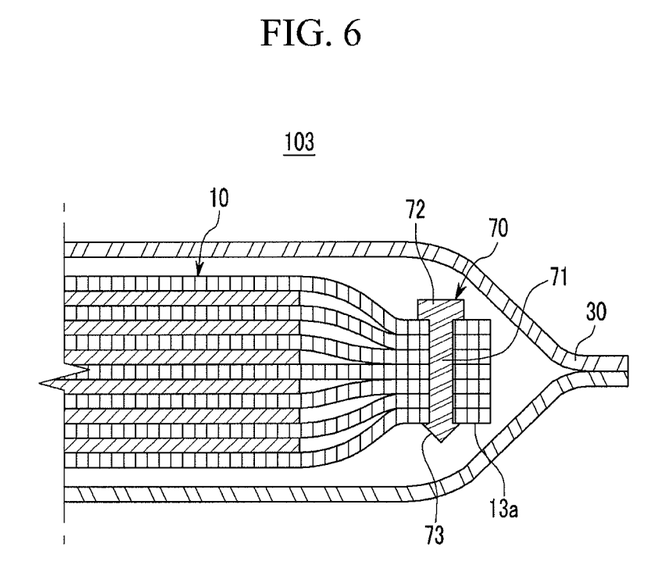
FIG. 6 is a partial cross-sectional view of a rechargeable battery according to a fourth exemplary embodiment of the present invention.

FIG. 6 is a partial cross-sectional view of a rechargeable battery according to a fourth exemplary embodiment of the present invention.

Referring to FIG. 6, a rechargeable battery 103 according to the present exemplary embodiment is the same as the rechargeable battery 100 of the first exemplary embodiment, excluding a structure of a fixing member 50, and therefore a description for the same structure will not be provided.

A fixing member 70 according to the present exemplary embodiment includes a first support contacting a first outer side of an expanded portion 13a and a second support contacting a second outer side of the expanded portion 13a, facing the opposite direction of the first outer side.

The fixing member 70 according to the present exemplary embodiment includes a joining portion 71 penetrating the expanded portion 13a, a head portion 72 formed at one end of the joining portion 71 with a larger horizontal cross-section than the joining portion 71 and contacting the first outer side of the expanded portion 13a, and a hook 73 protruding from an external circumference of the other end of the joining portion 71 and contacting the second outer side of the expanded portion 13a. The hook 73 a conical shape of which a cross-section is gradually decreased as it goes away from the joining portion 71.

The head portion 72 becomes a first support and the hook 73 becomes a second support according to the present exemplary embodiment. As described, the fixing member 70 is integrally formed according to the present exemplary embodiment so that it can be more easily installed and separation of the hook 73, which is the second support from the joining portion 71 can be prevented.

Figure 7:
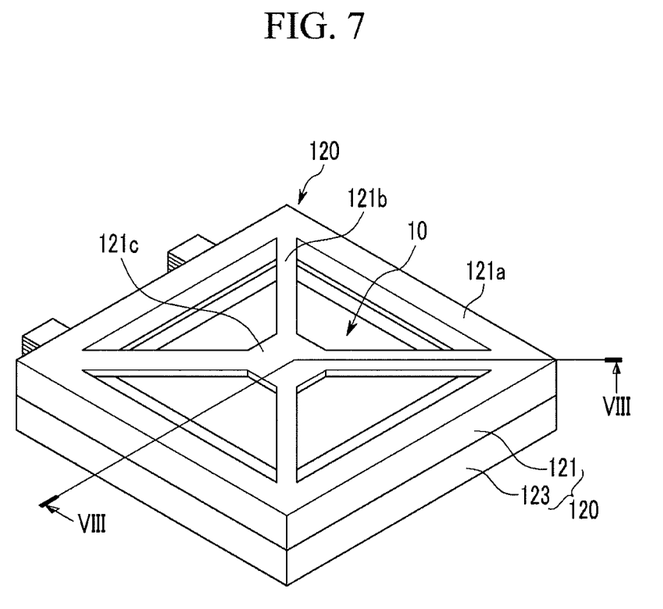
FIG. 7 is a perspective view of an electrode assembly of a rechargeable battery according to a fifth exemplary embodiment of the present invention.
Figure 8:
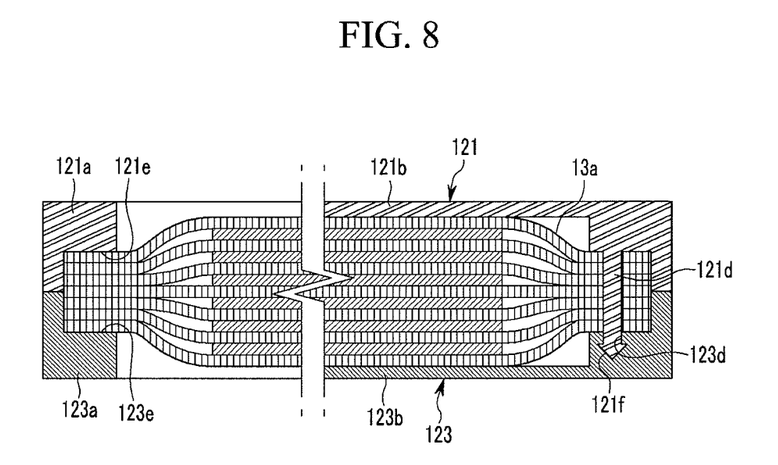
FIG. 8 is a cross-sectional view of FIG. 7, taken along the line VIII-VIII.

FIG. 7 is a perspective view of an electrode assembly and a fixing member according to a fifth exemplary embodiment of the present invention and FIG. 8 is a cross-sectional view of FIG. 7, taken along the line VIII-VIII.

Referring to FIG. 7 and FIG. 8, a rechargeable battery according to the present exemplary embodiment is the same as the rechargeable battery of the first exemplary embodiment, excluding a structure of a fixing member 120, and therefore a description for the same structure will not be further provided.

A fixing member 120 includes a first fastening unit 121 provided to contact an upper side of an electrode assembly 10 by penetrating an expanded portion 13a and a second fastening unit 123 provided to be fitted to the first fastening unit 121 and contact a bottom side of the electrode assembly 10.

The first fastening unit 121 includes a first support bar 121a extended along the expanded portion 13a and a second support bar 121b extended in the diagonal direction of a separator 13. Four of first support bars 121a are connected with each other in a rectangular ring shape, and the second support bar 121b is formed extended in the diagonal direction from a portion where the first support bars 121a are connected.

A groove 121e is formed at a bottom side of the first support bar 121a and the expanded portion 13a is inserted to the groove 121e. An inner side of the groove 121e contacts the expanded portion 13a to press the expanded portion 13a to the inner side. Meanwhile, a protrusion 121d is formed at a corner where the first support bars 121a are connected, and a hook 121f is formed at the end of the protrusion 121d. The protrusion 121d is coupled with the second fastening unit 123 by penetrating the expanded portion 13a.

Two of the second support bars 121b cross each other, and a pressing plate 121c is formed at a crossing portion of the second support bars 121b. The pressing plate 121c is located at a center of the upper side of the electrode assembly 10 and presses the electrode assembly 10 to the inside.

Like the first fastening unit 121, the second fastening unit 123 includes a first support bar 123a extended along the expanded portion 13a and a second support bar 123b extended along the diagonal direction of the separator 13. Four of the first support bars 123a are connected with each other in a rectangular ring shape, and two of the second support bars 123b are extended along the diagonal direction of the electrode assembly 10 from a corner where the first support bars 123a are connected. A groove 123e is formed at a bottom side of the first support bar 123a and the expanded portion 13a is inserted into the groove 123e. The side ends of the first support bars 121a and 123a formed at upper and lower portions of the electrode assembly 10 contact each other such that the first support bars 121a and 13a surround the side end of the expanded portion 13a.

The groove 123e is formed at an upper side of the first support bar 123a and the expanded portion 13a is inserted into the groove 123e. That is, the grooves 121e and 123e are formed at sides of the first support bars 121a and 123a, facing each other. An inner side of the groove 123e contacts the expanded portion 13a to press the expanded portion 13a to the inside. A fastening groove 12d to which a protrusion 121d is inserted in formed at a corner where the first support bars 123a are connected, and has a narrow inlet for hooking a hook 121f therein.

As described, according to the present exemplary embodiment, the electrode assembly 10 can be stably fixed by inserting the protrusion 121d into the fastening groove 123d. In addition, the expanded portion 13a is inserted between the first support bars 121a and 123a, and the shape of the electrode assembly 10 can be stably maintained because the first support bars 121a and 123a press the expanded portion 13a to the inside. In addition, since the second support bars 121b and 123b and the pressing plate 121c support the inside of the electrode assembly 10, an increase of an internal gap of the electrode assembly 10 due to iterative charging and discharging of the electrode assembly 10 can be inhibited such that the charging and discharging efficiency can be improved.

In addition, the first and second fastening units 121 and 123 according to the present exemplary embodiment are made of porous materials so that the fixing member can store electrolyte solution. In addition, the first and second fastening units 121 and 123 are made of elastic materials so that transmission of external impact to the electrode assembly 10 can be buffered.

Figure 9:
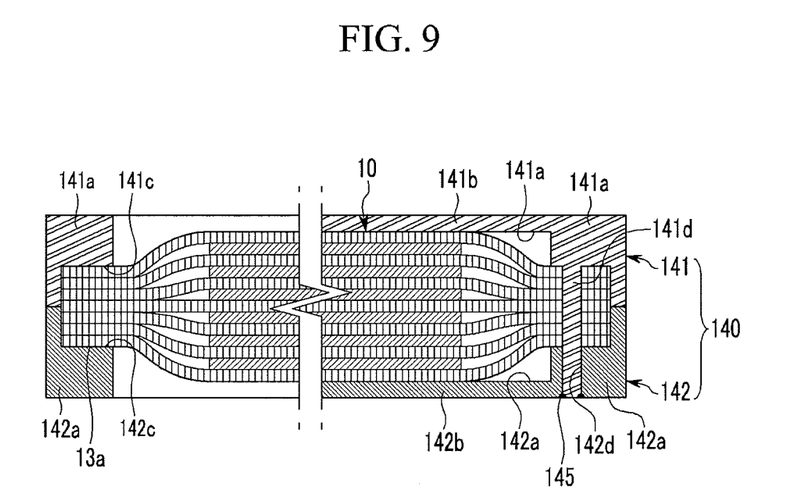
FIG. 9 is a cross-sectional view of an electrode assembly and a fixing member of a rechargeable battery according to a sixth exemplary embodiment of the present invention.

FIG. 9 is a cross-sectional view of an electrode assembly and a fixing member according to a sixth exemplary embodiment of the present invention.

Referring to FIG. 9, a rechargeable battery according to the present exemplary embodiment is the same as the rechargeable battery 100 of the first exemplary embodiment, excluding a structure of a fixing member 140, and therefore a description for the same structure will not be further provided.

A fixing member 140 includes a first fastening unit 141 penetrating an expanded portion 13a and a second fastening unit 142 fitted to the first fastening unit 141.

The first fastening unit 141 includes a first support bar 141a extended along the expanded portion 13a and a second support bar 141b extended along the diagonal direction of a separator 13.

Four of the first support bars 141a are connected with each other in a rectangular ring shape, and the second support bar 141b is extended along the diagonal direction from a portion where the first support bars 141a are connected. A groove 141b to which the expanded portion 13a is inserted is formed at a bottom side of the first support bar 141a. A protrusion 141d is formed at a corner where the first support bars 141a are connected, and the protrusion 141d is coupled with the second fastening unit 142 by penetrating the expanded portion 13a.

The second fastening unit 142 includes a first support bar 142a extended along the expanded portion 13a and a second support bar 142b extended in the diagonal direction of a separator 13 in substantially the same manner as shown with the fastening units of FIG. 7.

Four of the first support bars 142a are connected with each other in a rectangular ring shape, and the second support bar 142b is extended in the diagonal direction from a portion where the first support bars 142a are connected. A groove 142c to which the expanded portion 13a is inserted is formed at a bottom side of the first support bar 142a. At a corner where the first support bars 142a are connected, a fastening hole 142d to which the protrusion 141d is inserted is formed. While being inserted to the fastening hole 142d, the protrusion 141d is welded to the second fastening unit 142 so that a welded portion 145 is formed where the protrusion 142d and the fastening hole 142d are in contact with each other.

As described, according to the present exemplary embodiment, the protrusion 141d is welded to the second fastening unit 142 so that the electrode assembly 10 can be further stably supported.

Figure 10:
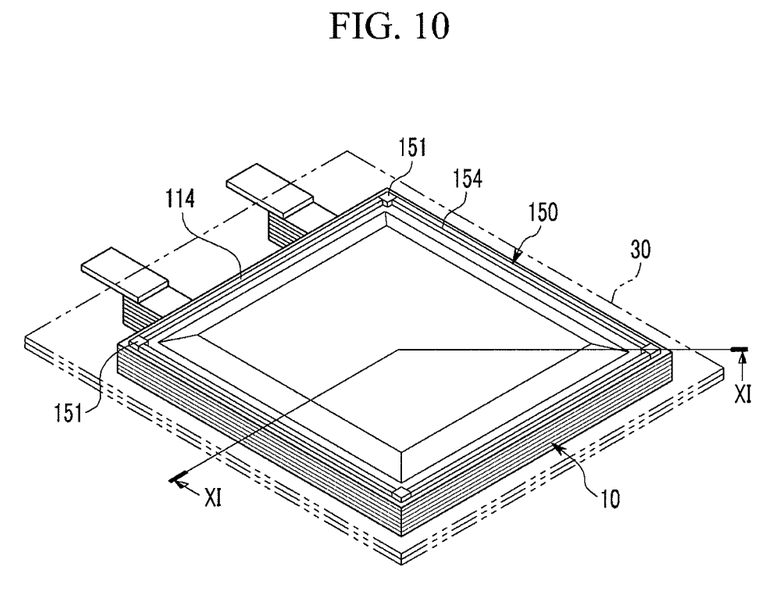
FIG. 10 is a perspective view of a rechargeable battery according to a seventh exemplary embodiment of the present invention.
Figure 11:
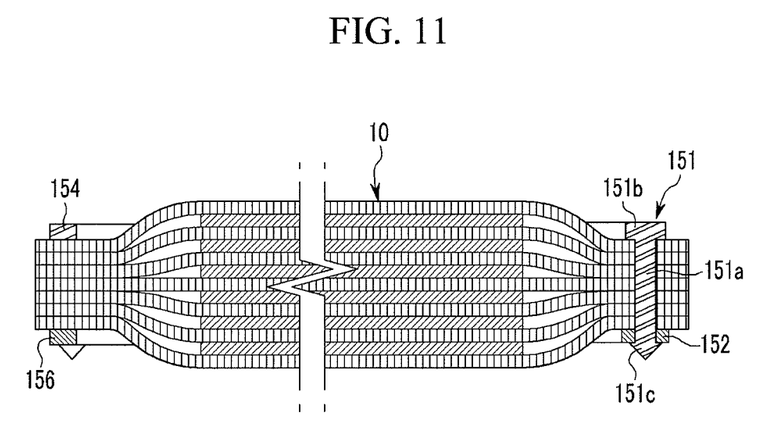
FIG. 11 is a cross-sectional view of FIG. 7, taken along the line XI-XI.

FIG. 10 is a perspective view of a rechargeable battery according to a seventh exemplary embodiment of the present invention and FIG. 11 is a cross-sectional view of FIG. 10, taken along the line XI-XI.

Referring to FIG. 10 and FIG. 11, a rechargeable battery according to the present exemplary embodiment is the same as the rechargeable battery 100 of the first exemplary embodiment, excluding a structure of a fixing member 150, and therefore a description for the same structure will not be further provided.

A fixing member 150 includes a first fastening unit 151 penetrating an expanded portion 13a and a second fastening unit 152 fitted to the first fastening unit 151.

The first fastening unit 151 includes a joining portion 151a formed in the shape of a bar, a head portion 151b protruding from a first end of the joining portion 151a, and a hook 151c protruding from a second end of the joining portion 151, and the second fastening unit 152 includes a hole fixed to the hook 151c.

The first fastening unit 151 and the second fastening unit 152 are respectively formed at corners of a separator 13. A first support bar 154 connecting the head portions 151b is fixed to the head portion 151b.

The first support bar 154 is extended along an upper side edge of the separator 13, and both ends thereof are fixed to a head portion 151b of a neighboring first fastening unit 151.

In addition, a first support bar 156 is fixed to the second fastening unit 152 as well, and the first support bar 156 is extended along a lower side edge of the separator 13.

The separator 13 is formed in the shape of a rectangular sheet, and four of the first support bars 154 and 156 are provided at upper and lower sides of the electrode assembly 10.

Thus, the first support bars 154 and 156 press the expanded portion 13a located at a side end between the fastening units 151 and 152 to the inside to thereby stably support the electrode assembly 10.

Figure 12:
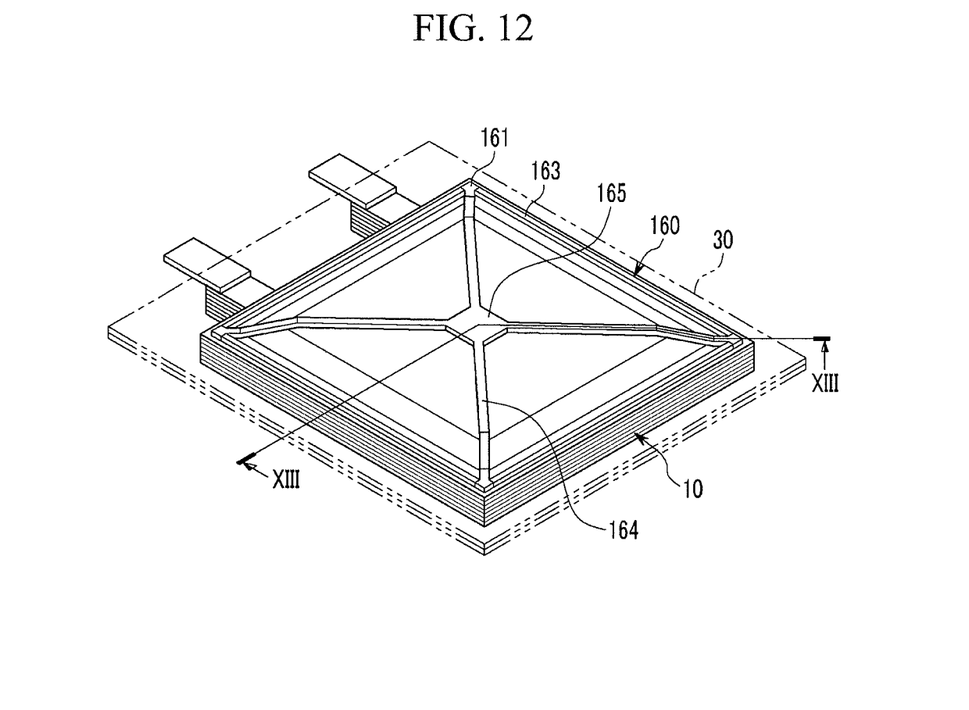
FIG. 12 is a perspective view of a rechargeable battery according to an eighth exemplary embodiment of the present invention.
Figure 13:
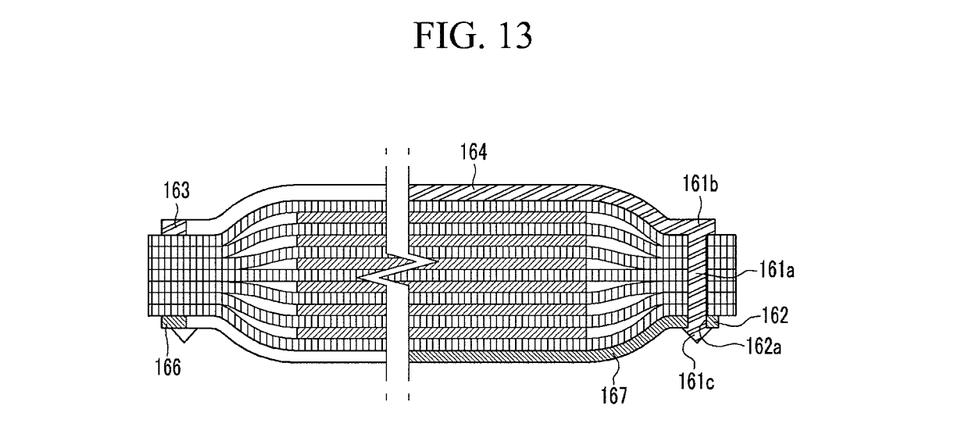
FIG. 13 is a cross-sectional view of FIG. 9, taken along the line XIII-XIII.

FIG. 12 is a perspective view of a rechargeable battery according to an eighth exemplary embodiment of the present invention and FIG. 9 is a cross-sectional view of FIG. 12, taken along the line XIII-XIII.

Referring to FIG. 12 and FIG. 13, a rechargeable battery according to the present exemplary embodiment is the same as the rechargeable battery 100 of the first exemplary embodiment, excluding a structure of a fixing member 160, and therefore a description for the same structure will not be further provided.

A fixing member 160 includes a first fastening unit 151 penetrating an expanded portion 13a and a second fastening unit 152 fitted to the first fastening unit 151.

The first fastening unit 161 includes a joining portion 161a formed in the shape of a bar, a head portion 161b protruding from a first end of the joining portion 161a, and a hook 161c protruding from a second end of the joining portion 161, and the second fastening unit 162 includes a hole fixed to the hook 161c.

A first support bar 163a extended along the expanded portion 13a and a second support bar 164 extended in the diagonal direction of a separator 13 are fixed to the first fastening unit 161. The first support bar 163 and the second support bar 164 are formed in the shape of a rectangular bar.

Four of the first support bars 163 are connected with each other and two of the second support bars 164 cross each other, and a pressing plate 165 is formed at a crossing portion of the second support bars 164. The pressing plate 165 is located at a center of an upper side of an electrode assembly 10 to press the electrode assembly 10 to the inside.

A hole 162a to which the joining portion 161a is hooked is formed in the second fastening unit 162, and a hook 161c is fixed to a circumference of the hole 162a.

Like the first fastening unit 161, a first support bar 166 extended along the expanded portion 13a and a second support bar 167 extended in the diagonal direction of the separator 13 are fixed to the second fastening unit 162.

As described, according to the present exemplary embodiment, the first support bars 163 and 166 support the side end of the electrode assembly 10 and the pressing plate 165 and the second support bars 164 and 167 support the electrode assembly 10 by pressing the center portion of the electrode assembly 10 to the inside so that the electrode assembly 10 can be further stably supported.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
   an electrode assembly including a positive electrode, a negative electrode, a separator disposed between the positive and negative electrodes and wherein the separator has an expanded portion protruding to the outside of the positive and negative electrodes;
   a fixing member including a first support contacting a first outer side of the expanded portion, a second support contacting a second outer side, facing the opposite direction of the first outer side, and a joining portion joining the first and second supports; and
   a terminal electrically connected with the electrode assembly.

2. The rechargeable battery of claim 1, wherein the fixing member penetrates the expanded portion.

3. The rechargeable battery of claim 1, wherein the separator is configured to have corners and wherein the fixing member is formed at each corner of the separator.

4. The rechargeable battery of claim 3, further comprising a first support bar that connects the fixing members and extends along the expanded portion.

5. The rechargeable battery of claim 4, wherein a groove to which the expanded portion is inserted is formed in the first support bar.

6. The rechargeable battery of claim 4, further comprising a second support bar connecting the fixing members that extends in the diagonal direction of the separator.

7. The rechargeable battery of claim 6, wherein the second support bar comprises a plurality of second support bars and wherein a pressing plate is formed in a crossing portion of the plurality of second support bars.

8. The rechargeable battery of claim 1, wherein the fixing member comprises a first fastening unit including a joining portion penetrating the expanded portion and a head portion formed at a first end of the joining portion with a larger horizontal cross second than the joining portion and a second fastening unit fitted to the first fastening unit.

9. The rechargeable battery of claim 8, wherein a hook protruding from an external circumference of the joining portion is formed at a second end of the joining portion, opposite to the first end where the head portion is formed.

10. The rechargeable battery of claim 8, wherein the first fastening unit and the second fastening unit are screw-coupled.

11. The rechargeable battery of claim 8, wherein the second fastening unit is welded to the first fastening unit.

12. The rechargeable battery of claim 1, wherein the fixing member comprises a joining portion penetrating the expanded portion, a head portion formed at a first end of the joining portion with a larger horizontal cross section than the joining portion, and a head portion contacting a first outer side of the separator, and a hook protruding from an external circumference of a second end of the joining portion and contacting a second outer side of the separator.

13. The rechargeable battery of claim 12, wherein a cross section of the hook is gradually decreased at locations distal from the joining portion.

14. The rechargeable battery of claim 1, wherein the fixing member comprises:
    a first fastening unit including a plurality of first support bars extended along the expanded portion and connected with each other and a protrusion protruding from a corner where the first support bars are connected, and arranged to contact a second side of the electrode assembly; and
    a second fastening unit including a plurality of first support bars extended along the expanded portion and connected with each other and a fastening groove to which the protrusion is inserted formed at a corner where the first support bars are connected, and arranged to contact the second side of the electrode assembly.

15. The rechargeable battery of claim 14, wherein a hook protruding from an external circumference of the protrusion is formed at a lower end of the protrusion, and the hook is hooked to an inlet of the fastening groove.

16. The rechargeable battery of claim 14, wherein a groove to which the expanded portion is inserted is formed at a side facing the first support bar of the first fastening unit and the first support bar of the second fastening unit.

17. The rechargeable battery of claim 14, comprising a second support bar extended in the diagonal direction of the electrode assembly at the corner.

18. The rechargeable battery of claim 1, wherein the fixing member comprises:
    a first fastening unit including a plurality of first support bars extended along the expanded portion and connected with each other and a protrusion protruding from a corner where the first support bars are connected, and arranged to contact a second side of the electrode assembly; and
    a second fastening unit including a plurality of first support bars extended along the expanded portion and connected with each other and a fastening groove to which the protrusion is inserted formed at a corner where the first support bars are connected, and arranged to contact the second side of the electrode assembly, and
    a welded portion is formed at a portion where the protrusion and the fastening hole are in contact with each other.

19. The rechargeable battery of claim 1, wherein the fixing member is made of a porous material.

20. A rechargeable battery comprising:
    an electrode assembly including a positive electrode comprising a plurality of positive electrode sheets, a negative electrode comprising a plurality of negative electrode sheets wherein each of the positive and negative electrode sheets have outer edges and wherein a separator sheet is interposed between each of the positive and negative electrode sheets, wherein the separator sheet extends outward from at least one of the outer edges of the positive and negative electrodes sheets;
    at least one fixing member that extends through the portion of the separator sheets that extend outward from at least one of the outer edges of the positive and negative electrode sheets and exerts force against an uppermost and lowermost separator sheets so as to secure the electrode assembly together; and
    a terminal electrically connected with the electrode assembly.

21. The battery of claim 20, wherein the at least one fixing member comprises a plurality of fixing members.

22. The battery of claim 21, wherein the plurality of fixing members are interconnected by support members.

23. The battery of claim 22, wherein the separator sheets are substantially square in appearance and wherein the supporting members extend diagonally between fixing members that are positioned at the corners of the separator sheets.

* * * * *